United States Patent
Proctor

(10) Patent No.: US 8,224,324 B2
(45) Date of Patent: Jul. 17, 2012

(54) METHOD OF CELL RE-SELECTION IN MULTIMEDIA BROADCAST MULTICAST SERVICE (MBMS) SYSTEM AFTER MBMS SESSION STOP

(75) Inventor: Toby Kier Proctor, Salisbury Wiltshire (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1021 days.

(21) Appl. No.: 11/883,925

(22) PCT Filed: Feb. 8, 2006

(86) PCT No.: PCT/GB2006/000443
§ 371 (c)(1),
(2), (4) Date: Apr. 18, 2008

(87) PCT Pub. No.: WO2006/085070
PCT Pub. Date: Aug. 17, 2006

(65) Prior Publication Data
US 2009/0047953 A1     Feb. 19, 2009

(30) Foreign Application Priority Data

Feb. 8, 2005  (GB) ................................. 0502496.3

(51) Int. Cl.
*H04W 4/00* (2009.01)
(52) U.S. Cl. ................................................... 455/435.2
(58) Field of Classification Search ............... 455/435.2
See application file for complete search history.

(56) References Cited

U.S. PATENT DOCUMENTS

| | | | | |
|---|---|---|---|---|
| 7,436,811 | B2 * | 10/2008 | Putcha et al. | 370/343 |
| 7,539,493 | B2 * | 5/2009 | Kwak et al. | 455/436 |
| 2004/0202140 | A1 * | 10/2004 | Kim et al. | 370/335 |
| 2005/0090278 | A1 * | 4/2005 | Jeong et al. | 455/525 |
| 2005/0245260 | A1 * | 11/2005 | Nielsen et al. | 455/435.1 |
| 2006/0056347 | A1 * | 3/2006 | Kwak et al. | 370/329 |

* cited by examiner

*Primary Examiner* — Nathan Mitchell
(74) *Attorney, Agent, or Firm* — Staas & Halsey LLP

(57) ABSTRACT

Cell re-selection for a mobile terminal in a single frequency layer includes determining termination of a multicast broadcast multimedia service (MBMS) session in that frequency layer and checking for availability of stored information relating to a previously used frequency. If this information is available, then a check of the validity of stored information is made. If this information is not available or is not valid, then the mobile station selects a frequency from the SIB 11/12 list and attempts cell selection on a suitable cell on the selected frequency. If the cell selection attempt is not successful, then initial cell selection procedures are carried out to determine to which cell the terminal should move.

3 Claims, 2 Drawing Sheets

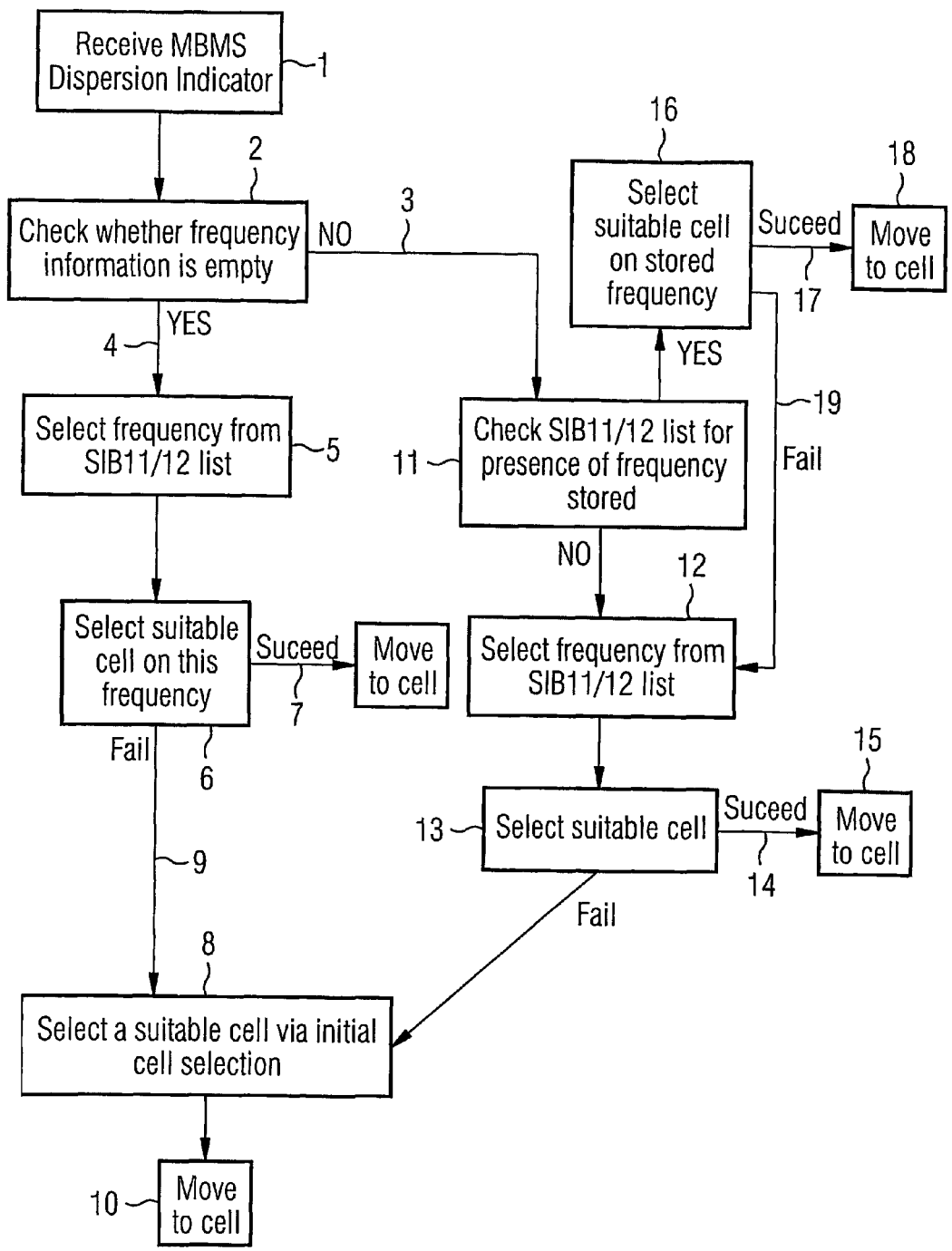

METHOD OF CELL RE-SELECTION IN MULTIMEDIA BROADCAST MULTICAST SERVICE (MBMS) SYSTEM AFTER MBMS SESSION STOP

CROSS REFERENCE TO RELATED APPLICATIONS

This application is based on and hereby claims priority to United Kingdom Application No. 0502496.3 filed on Feb. 8, 2005, the contents of which are hereby incorporated by reference.

BACKGROUND

Described below is a method of dispersion of mobile terminals in a communication system, in particular for second and third generation mobile phone systems, such as Universal Mobile Telecommunications System Terrestrial Radio Access Network (UTRAN), offering multicast broadcast multimedia services' (MBMS) or other broadcast services.

Broadcast services, such as MBMS which is standardized in radio access network (RAN), are becoming more and more important for mobile communication networks. Studies of MBMS have shown that MBMS may require up to 30% to 40% of NodeB available power, depending on the scenario, which means most operators may only provide MBMS on one wideband code division multiple access (WCDMA) carrier. Limiting to a single carrier is also beneficial for mobility purposes and for combining gains at cell edges. As the traffic in the network increases, operators may have to use more than one of their frequencies. In particular, a second carrier would be required for micro and Pico NodeBs to cover hot spot areas with high traffic volumes.

Thus, frequency layer convergence (FLC) for MBMS is applied so that an MBMS notification is sent in all cells on all frequencies indicating a final service providing layer. All user equipments (UEs) interested in receiving the notified service via MBMS then re-select to this layer, which is brought about by applying certain offset values. MBMS operation may be performed on a single frequency layer (in a multi-frequency UTRAN network) by indicating to the UE the layer in which the MBMS data is being sent and an offset which is applied to the TIE cell reselection parameters to ensure that the UE moves to the preferred frequency when it wants to receive the MBMS service.

However, having reached the single layer and duly received the MBMS service, termination of the MBMS service means that the offset is no longer applied and the UEs return to normal operation. However, the UEs are prone to remain camped in the new macro cell on the MBMS frequency, since existing cell reselection procedures in the UTRAN are defined such that a TIE may prefer to stay on in a current cell or existing frequency, even if it is not the best cell or frequency for that UE, so as to avoid continuous reselection for UEs on a border between cells. This concentration of UEs in a particular cell at the end of the service is undesirable because any additional movement of the UE between cells in the undesirable frequency will result in uplink signalling which causes more interference than if the UE had been on a more appropriate frequency. This increase in interference may result in instability in the system, and a reduction in the cell radius.

Proposals have been made to deal with this problem by imposing a random distribution of the UEs in the cell at the end of the MBMS session, to different frequencies and cells. However, this leads to subsequent reselections according to normal cell reselection rules, as the cells move to their favored cells, so the increased number of cell reselections gives rise to an increase in uplink signalling, if the UE is in cell forward access channel (Cell_FACH) or cell paging channel (CelL-PCH) state.

The end of the service is detected by the UE reading MCCH and receiving the session stop information. Alternatively the UE can read the MCCH and detect that the session which it was previously receiving on MTCH is no longer described in the information on MCCH, indicating that the session is no longer being sent on MTCH.

After a service is complete, the offset is no longer applied, and the UE (under current assumptions and specification) returns to normal operation while still camped in the new cell. Existing cell reselection procedures in the UTRAN are defined such that a UE may prefer to stay on the existing cell even if it is not the best cell in order to avoid continuous reselections for UEs on a border between cells. Hence the existing procedures are not optimum for dispersing UEs after an MBMS session has completed.

SUMMARY

The method of cell re-selection for a mobile terminal in a single frequency layer described below includes determining termination of a multicast broadcast multimedia service (MBMS) session in the single frequency layer and checking for availability of stored information relating to a previously used frequency. If the stored information is available, the validity of the stored information is checked; and if not available, or not valid, the mobile terminal to carries out initial cell selection procedures determining to which cell the terminal should move.

The method described below deals with the problem of UEs remaining in a single frequency layer macro cell at the end of an MBMS transmission by checking to see whether a UE can move to a previously used frequency first, but if that frequency is no longer available, then each UE is treated in the same way as a UE that is not registered with the network, ignoring the existing parameters and simply looking for the best cell for that UE, without taking into account where it already is.

BRIEF DESCRIPTION OF THE DRAWINGS

These and other objects and advantages will become more apparent and more readily appreciated from the following description of an example of a method of cell re-selection for a mobile terminal in a single frequency layer, taken in conjunction with the accompanying drawings in which:

FIG. 2 is a flow diagram of the method described below.

DETAILED DESCRIPTION OF THE PREFERRED EMBODIMENT

Figure 1:
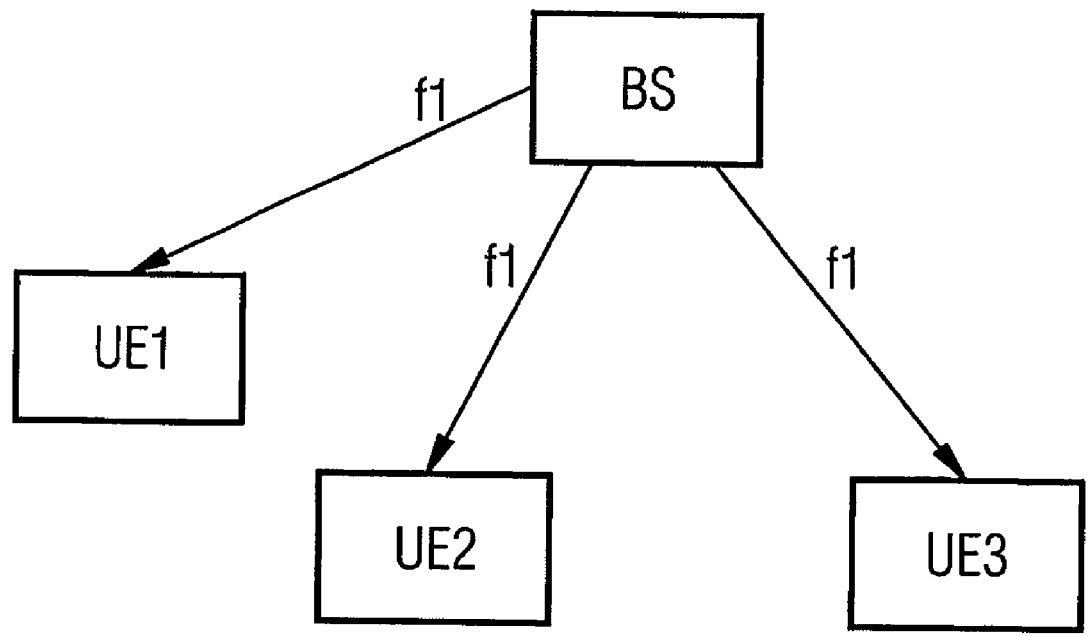
FIG. 1 is a block diagram of a system in which the method may be carried out.

Reference will now be made in detail to the preferred embodiments, examples of which are illustrated in the accompanying drawings, wherein like reference numerals refer to like elements throughout.

A typical system in which the method described below can be used is shown in FIG. 1. A number of UEs, (UE1, UE2, UE3) receive an MBMS broadcast from a base station (BS) at a first frequency, fl. When the MBMS session has finished, the BS sets an MBMS dispersion indicator to clear the UEs off frequency, fl. This may be in order to free it up for another MBMS session, or because the frequency is not actually the best one for each UE.

FIG. 2 illustrates the method in more detail, including the requirements of the standard. When a UE receives 1 the MBMS dispersion indicator, the UE first checks 2 whether or not there is stored frequency information regarding a previously used frequency. If the store is not empty 3, then a further check 11 is made to see lithe frequency is on the SIB 11/12 list and if it is not, then a frequency is selected 12 from that list. A suitable cell is selected 13 at that chosen frequency and provided that is successful 14, the UE moves 15 to that cell. If the stored frequency is on the SIB 11/12 list, then a suitable cell on the stored frequency is selected 16 and if that succeeds 17, then the UE moves to that cell 18, or if that selection fails 19, then a frequency that is on the SIB 11/12 list is chosen.

If, when the store is initially checked 2 for stored frequency information, it is found to be empty 4, then a frequency is selected 5 from the SIB 11/12 list and a suitable cell is selected 6. If the cell selection succeeds 7, then the UE moves to the cell, but lithe cell selection fails, then a suitable cell is selected via the initial cell selection procedure 8 and the UE moves 10 to that cell.

The UE performs the cell selection without taking into account any of the existing stored parameters, or contexts in the UE, as described for initial cell selection in 3GPP TS 25.304. No prior knowledge of which RF channels are UTRA carriers is required. The UE scans all RF channels in the UTRA bands according to its capabilities to find a suitable cell of a selected public land mobile network (PLMN). On each carrier the *UE only searches for the strongest cell and once this is found, it is selected. Although, this procedure is currently only used for UEs which are not registered in a network, applying this procedure to the case where the UE is connected and has just finished receiving an MBMS session allows for an efficient dispersion of UEs to the best cell and frequency for their current location, without the drawbacks of known solutions.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of cell re-selection for a mobile terminal in a single frequency layer, the method comprising:
   upon determining termination of a multicast broadcast multimedia service session in the single frequency layer, checking for availability of stored information relating to a previously used frequency used previously by the mobile terminal;
   checking validity of the stored information after availability has been checked successfully, by checking whether the stored information relates to a frequency on a list;
   if either the stored information is unavailable or the stored information is determined to be invalid, selecting both a frequency on the list and a suitable cell on this frequency; and
   if said selecting of the suitable cell fails, causing the mobile terminal to carry out initial cell selection procedures determining to which cell the mobile terminal should move.

2. A method according to claim 1, wherein the initial cell selection procedures are in accordance with 3GPP TS 25.304.

3. A method according to claim 1, wherein the list is a system information block 11/12 list.

* * * * *